United States Patent
Lee et al.

(10) Patent No.: US 10,764,797 B2
(45) Date of Patent: Sep. 1, 2020

(54) METHOD FOR HANDLING FAILURE OF HANDOVER PROCEDURE IN WIRELESS COMMUNICATION SYSTEM AND APPARATUS THEREFOR

(71) Applicant: LG ELECTRONICS INC., Seoul (KR)

(72) Inventors: Jaewook Lee, Seoul (KR); Youngdae Lee, Seoul (KR); Sangwon Kim, Seoul (KR); Gwanmo Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/091,084

(22) PCT Filed: Apr. 18, 2017

(86) PCT No.: PCT/KR2017/004137
§ 371 (c)(1),
(2) Date: Oct. 3, 2018

(87) PCT Pub. No.: WO2017/183884
PCT Pub. Date: Oct. 26, 2017

(65) Prior Publication Data
US 2019/0124567 A1     Apr. 25, 2019

Related U.S. Application Data (60) Provisional application No. 62/324,859, filed on Apr. 19, 2016.

(51) Int. Cl.
*H04W 36/00* (2009.01)
*H04W 76/19* (2018.01)
(Continued)

(52) U.S. Cl.
CPC ....... *H04W 36/0079* (2018.08); *H04W 36/08* (2013.01); *H04W 36/305* (2018.08); *H04W 76/19* (2018.02); *H04W 76/27* (2018.02)

(58) Field of Classification Search
None
See application file for complete search history.

(56) References Cited

U.S. PATENT DOCUMENTS

2012/0307709 A1* 12/2012 Ostergaard ............ H04L 1/1685
                                                          370/315
2013/0188615 A1* 7/2013 Dinan ............... H04W 56/0005
                                                          370/336
(Continued)

FOREIGN PATENT DOCUMENTS

WO     2013176483     11/2013

OTHER PUBLICATIONS

PCT International Application No. PCT/KR2017/004137, Written Opinion of the International Searching Authority dated Jul. 26, 2017, 8 pages.

*Primary Examiner* — Bunjob Jaroenchonwanit
(74) *Attorney, Agent, or Firm* — Lee, Hong, Degerman, Kang & Waimey (57) ABSTRACT

A method handling a link failure by a user equipment (UE) in a wireless communication system is disclosed. The method includes steps of suspending at least one data radio bearer (DRB) upon detecting an occurrence of the link failure; transmitting, to a specific cell, a radio resource control message indicating the occurrence of the link failure; receiving a response message as a response of the radio resource control message from the specific cell; and resuming the at least one suspended DRB.

8 Claims, 4 Drawing Sheets

(51) Int. Cl.
    *H04W 36/30*     (2009.01)
    *H04W 36/08*     (2009.01)
    *H04W 76/27*     (2018.01)

(56) References Cited

U.S. PATENT DOCUMENTS

| | | |
|---|---|---|
| 2013/0260810 A1 | 10/2013 | Rayavarapu |
| 2014/0016593 A1* | 1/2014 | Park .................. H04L 5/001 370/329 |
| 2015/0245407 A1 | 8/2015 | Johansson et al. |
| 2016/0057800 A1* | 2/2016 | Ingale ............... H04W 56/0005 370/216 |
| 2016/0095004 A1* | 3/2016 | Tseng ................ H04W 48/00 370/228 |
| 2016/0183156 A1* | 6/2016 | Chin ................. H04W 36/0022 370/331 |
| 2016/0212753 A1* | 7/2016 | Wu ................... H04W 72/085 |
| 2016/0277987 A1* | 9/2016 | Chen ................. H04L 5/0085 |
| 2018/0302944 A1* | 10/2018 | Chang ............... H04W 76/20 |

* cited by examiner

(A) Control-plane protocol stack (B) User-plane protocol stack

METHOD FOR HANDLING FAILURE OF HANDOVER PROCEDURE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/004137, filed on Apr. 18, 2017, which claims the benefit of U.S. Provisional Application No. 62/324,859, filed on Apr. 19, 2016, the contents of which are all hereby incorporated by reference herein in their entirety.

TECHNICAL FIELD

The present invention relates to a wireless communication system and, more particularly, to a method for handling a failure of a handover procedure in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
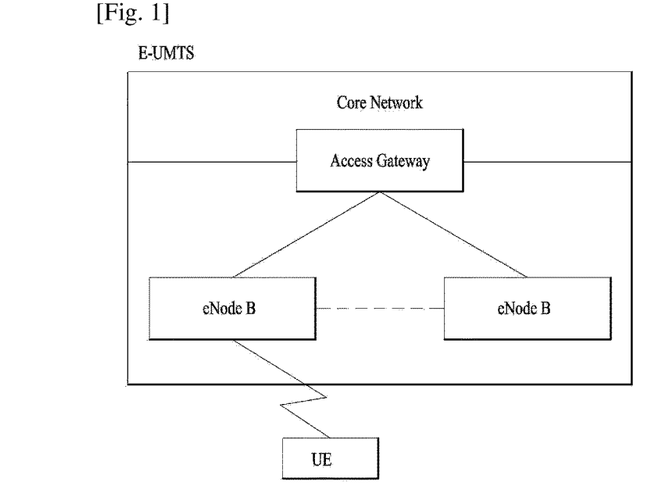
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION

Technical Problem

Based on the above discussion, the present invention proposes a method for handling a failure of a handover procedure in a wireless communication system and an apparatus therefor.

Solution to Problem

In accordance with an example of the present invention, a method for handling a link failure by a user equipment (UE) in a wireless communication system is disclosed. Especially, the method includes steps of suspending at least one data radio bearer (DRB) upon detecting an occurrence of the link failure; transmitting, to a specific cell, a radio resource control message indicating the occurrence of the link failure; receiving a response message as a response of the radio resource control message from the specific cell; and resuming the at least one suspended DRB.

Further, according to an example of the present invention, a user equipment (UE) in a wireless communication system is disclosed. Especially, the UE comprises a radio frequency (RF) unit; and a processor connected with the RF unit and configured to suspend at least one data radio bearer (DRB) upon detecting an occurrence of a link failure, transmit a radio resource control message indicating the occurrence of the link failure to a specific cell, receive a response message as a response of the radio resource control message from the specific cell, and resume the at least one suspended DRB.

Preferably, the response message includes an instruction to resume the at least one suspended DRB.

Preferably, the link failure may comprise a failure of a handover procedure and the specific cell is a source cell of the handover procedure. In this case, the source cell should have a UE context.

Further, the link failure may comprise a radio link failure (RLF) and the specific cell is a selected cell during cell selection procedure after the RLF. Of course. the selected cell should have the UE context.

Further, it is preferable that the radio resource control message comprises a RRC connection re-establishment request message, and the response message comprises a RRC connection re-establishment message.

It is to be understood that both the foregoing general description and the following detailed description of the present invention are exemplary and explanatory and are intended to provide further explanation of the invention as claimed.

Advantageous Effects of Invention

According to embodiments of the present invention, the failure of the handover procedure can be efficiently handled in the wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2:
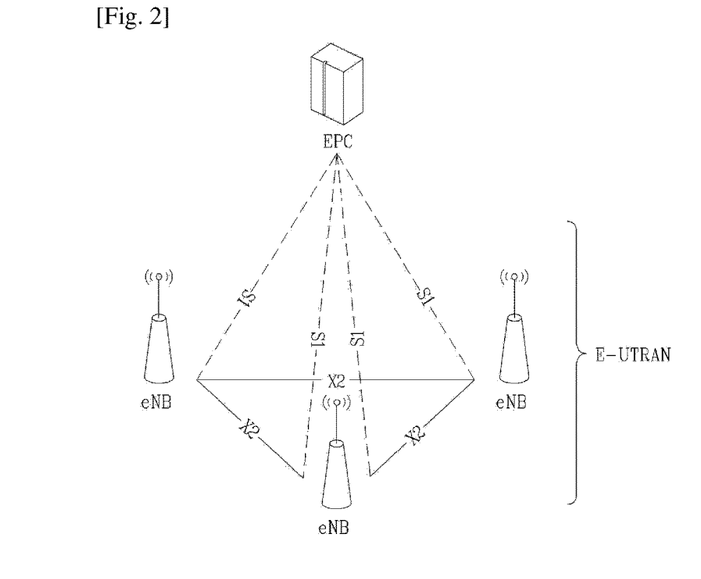
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
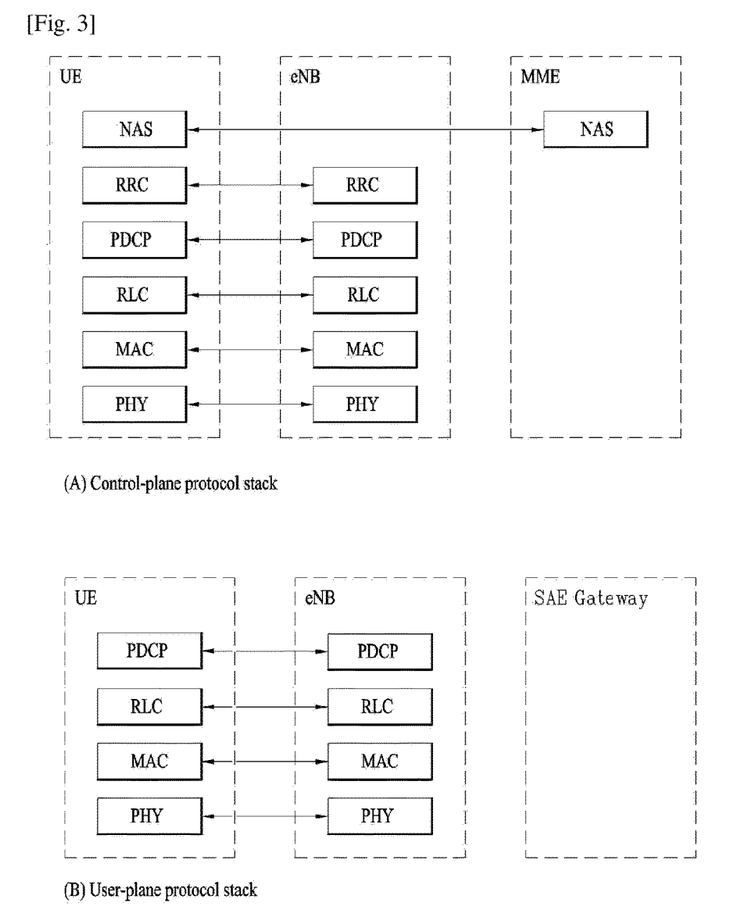
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information formation of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
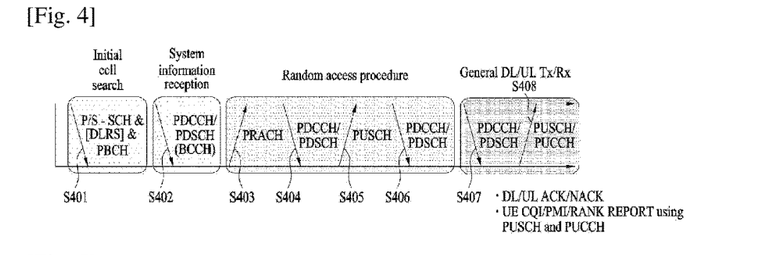
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
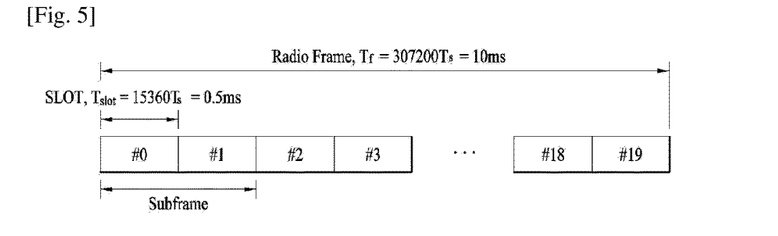
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200×$T_s$) and includes 10 subframes with the same size. Each subframe has a length of 1 ms and includes two slots. Each slot has a length of 0.5 ms (15360×$T_s$). Ts denotes a sampling time, and is represented by $T_s=1/(15 \text{ kHz} \times 2048) =3.2552?10^{-8}$ (about 33 ns). Each slot includes a plurality of OFDM symbols in a time domain, and includes a plurality of resource blocks (RBs) in a frequency domain. In the LTE system, one RB includes 12 sub-carriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, RRC state mode of the user equipment and RRC connection method will be described.

The RRC state mode means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) mode. If not so, it may be referred to as RRC idle (RRC_IDLE) mode.

Since the E-UTRAN may identify the presence of the user equipment which is in the RRC_CONNECTED mode, on the basis of cell unit, it may effectively control the user equipment. On the other hand, the E-UTRAN may not identify the user equipment which is in the RRC_IDLE mode, on the basis of cell unit. In this case, the user equipment is managed by the core network (CN) on the basis of tracking area (TA) unit which is a local unit greater than the cell unit. In other words, in order that the user equipment which is in the RRC_IDLE mode receives a normal mobile communication service such as voice or data, the user equipment should be shifted to the RRC_CONNECTED mode.

In particular, when the user initially turns on the power of the user equipment, the user equipment searches for a proper cell and then is maintained in the RRC_IDLE mode in the corresponding cell. The user equipment maintained in the RRC idle mode performs RRC connection establishment procedure with the RRC layer of the E-UTRAN only if the RRC connection is required, and then is shifted to the RRC_CONNECTED mode. In this case, the case where the RRC connection is required may include a case where uplink data transmission is required due to calling attempt of the user or a case where a response message to a paging message received from the E-UTRAN should be transmitted.

Hereinafter, a cell selection procedure and a cell reselection procedure will be described.

If the power of the user equipment is turned on, the user equipment should perform ready procedures for services by selecting a cell of proper quality. The user equipment which is in the RRC idle mode should always select a cell of proper quality and should be ready to receive services through this cell. For example, the user equipment which is just turned on should select a cell of proper quality to be registered with the network. If the user equipment which is in the RRC connected mode enters the RRC idle mode, this user equipment should select a cell which will stay in the RRC idle mode. In this way, to stay in a service standby mode such as the RRC idle mode, the procedure of allowing the user equipment to select a cell, which satisfies a specific condition, will be referred to as cell selection. Since the cell selection procedure is performed in a state that the user equipment fails to currently determine the cell which stays in the RRC idle mode, it is important to select the cell quickly if possible. Accordingly, if the cell provides radio signal quality more than a certain reference, this cell may be selected during the cell selection procedure of the user equipment even though the cell does not provide the best radio signal quality to the user equipment.

If the user equipment selects the cell, which satisfies the reference for cell selection, it receives information required for the operation of the corresponding cell in the RRC idle mode of the user equipment from the system information of the corresponding cell. After receiving all kinds of information required for the operation at the RRC idle mode, the user equipment is on standby in the RRC idle mode to request the network of services or receive services from the network.

After the user equipment selects a cell through the cell selection procedure, signal strength or signal quality between the user equipment and the base station may be changed due to mobility of the user equipment or change of a radio environment. If quality of the selected cell is deteriorated, the user equipment may select another cell that provides better quality. If the user equipment reselects a cell, it selects a cell that provides signal quality better than that of the currently selected cell. This will be referred to as a cell reselection procedure. The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal during the cell reselection procedure.

In order to reduce the interruption during mobility (e.g. handover) between two cells, the UE might be connected to a source cell and a target cell simultaneously for the time being. During the mobility procedure, it might fail to successfully connect to the target cell.

Under the current 3GPP specification, if the UE fails to connect to the target cell during the handover, the UE performs a RRC connection re-establishment procedure. This means that the UE starts from the scratch using default configuration. However, if the UE is not detached from the serving cell and the UE has a context, it might be better to use the stored UE context to reduce the interruption time of data.

Figure 6:
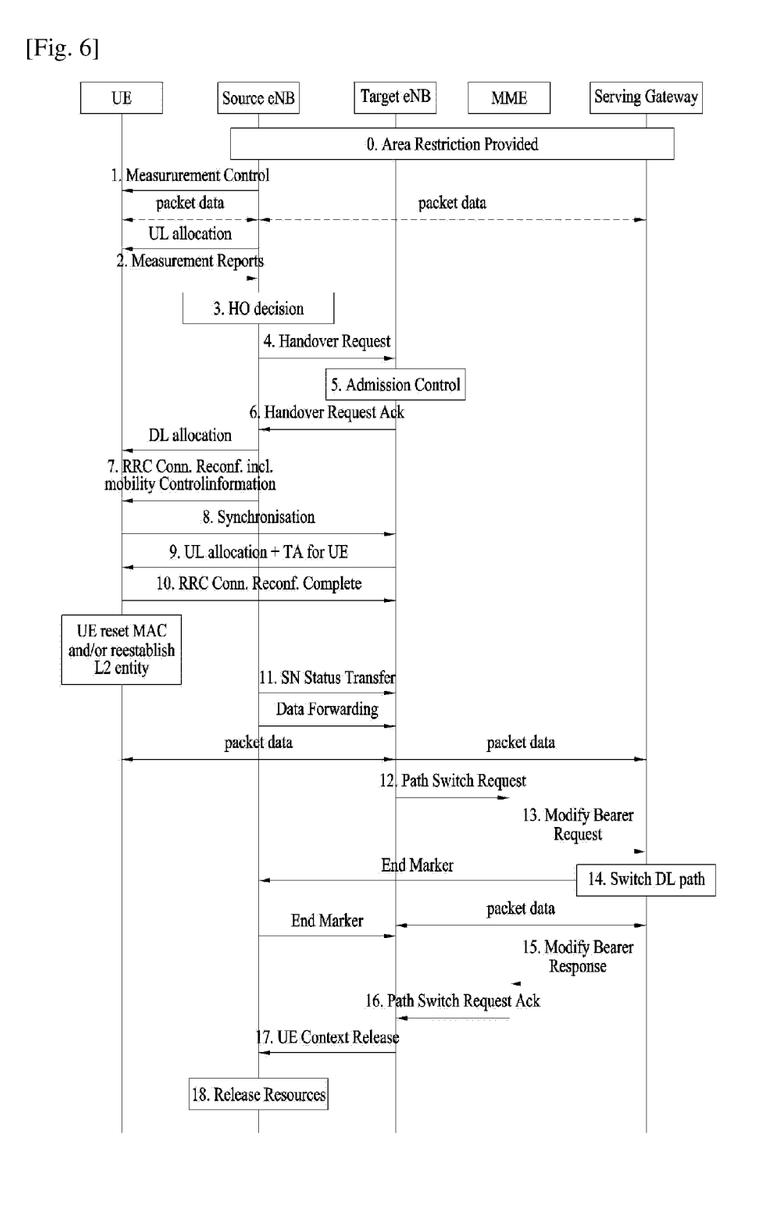
FIG. 6 is a diagram showing a handover procedure.

FIG. 6 is a diagram showing a handover procedure. Especially, in FIG. 6, the baseline assumption of the present application is that the UE stores L1/L2 configuration and continues to use L1/L2 configuration/entity in serving cell until mobility (e.g. handover) is successfully completed.

If the UE successfully complete mobility in target cell, the UE reset MAC and/or re-establish L2 entity for the source cell, after transmitting a RRC connection reconfiguration complete message in step 10. It may be possible that during the mobility is succeed, the UE may has dual MAC configuration/entities sand L2 entities for source cell and target cell.

In the present invention, it is assumed that the UE fails the mobility in the target cell. For example, in FIG. 6, it is considered that the UE fails the mobility in the target cell, when at least one of steps 8-10 is failed. In this case, the UE may return to the source cell. Further, the UE may select a new cell during a cell selection procedure after the failure of the mobility. Anyway, the source cell and the selected new cell should have the UE context. For convenience of explanation, it is assumed that the UE returns to the source cell after the failure of the mobility.

When the UE returns to the source cell, UE performs a RRC connection re-establishment procedure. In other words, the UE sends a RRC connection re-establishment request message (Instead of RRC connection re-establishment procedure, another procedure such as RRC connection resume procedure can be used in the proposed method. In case another procedure is used, the relevant RRC message is used) and UE performs one of the followings:

the UE continues to use MAC configuration and L2 entities for DRBs (data radio bearers) which were configured in serving cell and determines whether to release them or not upon receiving response message to RRC connection re-establishment request message from the source cell. In the response message, there may be indication on whether to continue to use or release MAC configuration/L2 entities and L2/L3 configuration (e.g. bearer configuration, AS security configuration).

the UE suspends the DRBs and resumes the suspended DRBs if source eNB indicates resumption of the suspended DRBs in the RRC connection re-establishment message.

That is, when the failure of the handover or a RLF (radio link failure) is occurred, the UE should suspend the DRBs and transmit a RRC message such as a RRC connection re-establishment request message. Then, the UE may receive the RRC connection re-establishment message as a response of the RRC connection re-establishment request message. Especially, according to the present invention, the RRC connection re-establishment message (i.e. response message) may include an instruction to resume the suspended DRBs.

On the other hand, when the UE returns to a source cell, UE can indicate a failure (e.g. handover (HO) failure, RLF) to the eNB via a PUCCH, a MAC CE (control element) or a RRC message, and UE performs one of the followings the UE continues to use MAC configuration and L2 entities for DRBs which were configured in serving cell and determines whether to release them or not upon receiving response message to the HO failure/RLF indication from the source cell. In the response message, there may be an indication on whether to continue to use or release MAC configuration/L2 entities and L2/L3 configuration. The response message is provided via the PUCCH, the MAC CE or the RRC message.

the UE suspends the DRBs and resumes the suspended DRBs if source eNB indicates resumption of the suspended DRBs in the response message.

Figure 7:
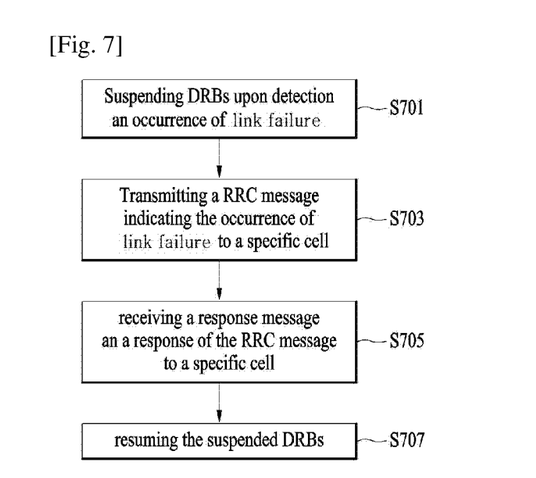
FIG. 7 is a diagram showing a method of handling the handover failure according to the present invention.

FIG. 7 is a diagram showing a method of handling the handover failure according to the present invention.

Referring to FIG. 7, in S701, the UE should suspend at least one data radio bearer (DRB) upon detecting an occurrence of the link failure. And, in S703, the UE may transmit to a specific cell, a radio resource control message indicating the occurrence of the link failure.

Preferably, the link failure comprises a failure of a handover procedure and radio link failure (RLF). In case of handover failure, the specific cell is a source cell of the handover procedure. More preferably, the source cell should have a UE context. Of course, the specific cell can be selected after the occurrence of the RLF, during a cell selection procedure. Similarly, the specific cell should have the UE context.

Next, in S705, the UE may receive a response message as a response of the radio resource control message from the specific cell, and in S707, may resume the at least one suspended DRB.

Preferably, the response message includes an instruction to resume the at least one suspended DRB. Further, the radio resource control message comprises a RRC connection re-establishment request message, and the response message comprises a RRC connection re-establishment message FIG. 8 is a block diagram illustrating a communication apparatus in accordance with an embodiment of the present invention.

Figure 8:
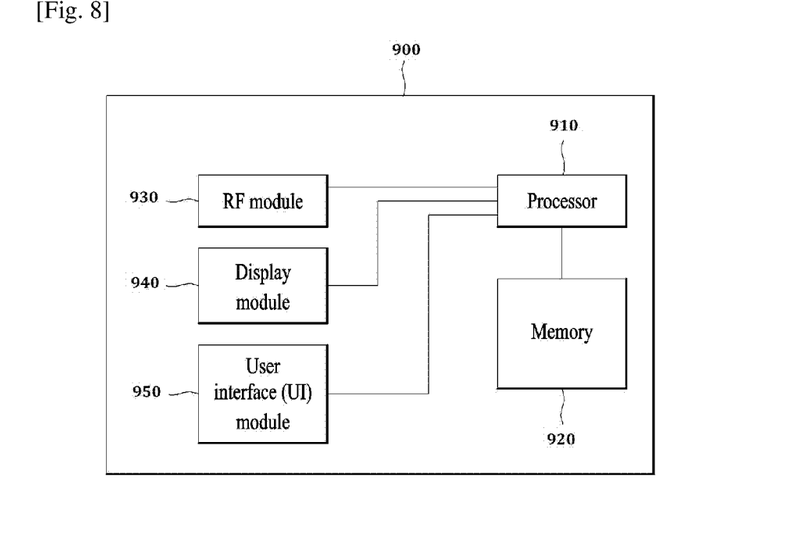
FIG. 8 is a block diagram of a communication apparatus according to an embodiment of the present invention.

Referring to FIG. 8, a communication device 900 includes a processor 910, a memory 920, a Radio Frequency (RF) module 930, a display module 940, and a user interface module 950.

The communication device 900 is illustrated for convenience of the description and some modules may be omitted. Moreover, the communication device 900 may further include necessary modules. Some modules of the communication device 900 may be further divided into sub-modules. The processor 910 is configured to perform operations according to the embodiments of the present invention exemplarily described with reference to the figures. Specifically, for the detailed operations of the processor 910, reference may be made to the contents described with reference to FIGS. 1 to 7.

The memory 920 is connected to the processor 910 and stores operating systems, applications, program code, data, and the like. The RF module 930 is connected to the processor 910 and performs a function of converting a baseband signal into a radio signal or converting a radio signal into a baseband signal. For this, the RF module 930 performs analog conversion, amplification, filtering, and frequency upconversion or inverse processes thereof. The display module 940 is connected to the processor 910 and displays various types of information. The display module 940 may include, but is not limited to, a well-known element such as a Liquid Crystal Display (LCD), a Light Emitting Diode (LED), or an Organic Light Emitting Diode (OLED). The user interface module 950 is connected to the processor 910 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for handling a failure of a handover procedure in a wireless communication system and an apparatus therefor has been described centering on an example applied to the 3GPP LTE system, the present invention is applicable to a variety of wireless communication systems in addition to the 3GPP LTE system.

The invention claimed is:

1. A method for handling a link failure by a user equipment (UE) in a wireless communication system, the method comprising:
   detecting an occurrence of the link failure;
   transmitting, to a specific cell, a radio resource control (RRC) connection re-establishment request message with maintaining configuration for at least one data radio bearer (DRB) configured in a serving cell;
   receiving a response message as a response of the RRC connection re-establishment request message from the specific cell, wherein the response message includes an indicator indicating whether to release the configuration for the at least one DRB configured in the serving cell or not; and
   communicating a signal via the at least one DRB to the specific cell when the indicator indicates not to release the configuration for the at least one DRB configured in the serving cell.

2. The method of claim 1, wherein the link failure comprises a failure of a handover procedure and the specific cell is a source cell of the handover procedure.

3. The method of claim 1, wherein the link failure comprises a radio link failure (RLF) and the specific cell is a selected cell during cell selection procedure after the RLF.

4. The method of claim 1, wherein the response message comprises a RRC connection re-establishment message.

5. A user equipment (UE) in a wireless communication system, the UE comprising:
   a radio frequency (RF) unit; and
   a processor connected with the RF unit and configured to:
   detect an occurrence of a link failure;
   transmit a radio resource control (RRC) connection re-establishment request message to a specific cell with maintaining configuration for at least one data radio bearer (DRB) configured in a serving cell;
   receive a response message as a response of the RRC connection re-establishment request message from the specific cell, wherein the response message includes an indicator indicating whether to release the configuration for the at least one DRB configured in the serving cell or not; and
   communicate a signal via the at least one DRB to the specific cell when the indicator indicates not to release the configuration for the at least one DRB configured in the serving cell.

6. The UE of claim 5, wherein the link failure comprises a failure of a handover procedure and the specific cell is a source cell of the handover procedure.

7. The UE of claim 5, wherein the link failure comprises a radio link failure (RLF) and the specific cell is a selected cell during cell selection procedure after the RLF.

8. The UE of claim 5, wherein the response message comprises a RRC connection re-establishment message.

* * * * *